United States Patent
Muckley et al.

(10) Patent No.: US 11,371,502 B2
(45) Date of Patent: Jun. 28, 2022

(54) SEALED DRIVE FOR CONNECTING PROGRESSIVE CAVITY PUMP ROTORS TO UNIVERSAL JOINTS

(71) Applicant: Graco Minnesota Inc., Minneapolis, MN (US)

(72) Inventors: David M. Muckley, Uniontown, OH (US); Paul Michael Jones, Uniontown, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/092,583

(22) Filed: Nov. 9, 2020

(65) Prior Publication Data

US 2021/0148358 A1  May 20, 2021

Related U.S. Application Data

(60) Provisional application No. 62/936,924, filed on Nov. 18, 2019.

(51) Int. Cl.
*F04C 2/107* (2006.01)
*F04C 15/00* (2006.01)
(Continued)

(52) U.S. Cl.
CPC ........ *F04C 2/1073* (2013.01); *F04C 15/0023* (2013.01); *F04C 15/0076* (2013.01);
(Continued)

(58) Field of Classification Search
CPC ............... F04C 2/1073; F04C 15/0023; F04C 15/0076; F04C 13/008; F04C 2240/10; F04C 2240/20; F04C 2240/60; F04C 13/001; F04C 15/0003; F04C 2240/30; F16D 1/108; F16D 2001/102; F16D 2300/08; F05B 2210/11; F05B 2240/10; F05B 2240/20; F05B 2240/60
See application file for complete search history.

(56) References Cited

U.S. PATENT DOCUMENTS 3,784,118 A   1/1974  Hurwitz
5,195,880 A * 3/1993  Gruber ................ F04C 15/0076
                                                           418/5

(Continued)

FOREIGN PATENT DOCUMENTS

BE        892404 A      7/1982
DE       1257582 B     12/1967
(Continued)

OTHER PUBLICATIONS

Extended European Search Report for EP Application No. 20208015.6, dated Apr. 21, 2021, pp. 9.

*Primary Examiner* — Mary Davis
(74) *Attorney, Agent, or Firm* — Kinney & Lange, P.A.

(57) ABSTRACT

A progressive cavity pump includes a sealed drive between the rotor and universal joint. The universal joint includes a socket configured to receive a drive shaft of the rotor. A cover, such as a locking nut, is disposed over the connection between the rotor and universal joint. Seals are retained in place by the locking nut to prevent abrasive materials from entering into the interface between the rotor and the universal joint.

6 Claims, 3 Drawing Sheets

(51) Int. Cl.
*F16D 1/108* (2006.01)
*F04C 13/00* (2006.01)
*F16D 1/10* (2006.01)

(52) U.S. Cl.
CPC ............ *F16D 1/108* (2013.01); *F04C 13/008* (2013.01); *F04C 2240/10* (2013.01); *F04C 2240/20* (2013.01); *F04C 2240/60* (2013.01); *F16D 2001/102* (2013.01); *F16D 2300/08* (2013.01)

(56) References Cited

U.S. PATENT DOCUMENTS

| | | | |
|---|---|---|---|
| 5,411,383 | A | 5/1995 | Parnell et al. |
| 5,421,780 | A | 6/1995 | Vukovic |
| 5,967,426 | A | 10/1999 | McLeod |
| 6,095,241 | A | 8/2000 | Bland et al. |
| 6,474,962 | B1 | 11/2002 | Allen et al. |
| 7,507,076 | B2 | 3/2009 | McLeod |
| 7,520,720 | B2 | 4/2009 | Welch |
| 8,556,608 | B2 | 10/2013 | Sakakihara |
| 8,764,420 | B2 | 7/2014 | Overmeier et al. |
| 10,286,338 | B2 | 5/2019 | Levitt |
| 2005/0051002 | A1 | 3/2005 | Brun |
| 2014/0227121 | A1 | 8/2014 | Parrett et al. |
| 2018/0128058 | A1* | 5/2018 | Hatherall ................ F16D 1/108 |

FOREIGN PATENT DOCUMENTS

| | | |
|---|---|---|
| DE | 2139013 A1 | 2/1973 |
| DE | 3710930 A1 | 10/1988 |
| DE | 102005039612 A1 | 2/2006 |
| EP | 3653879 A1 | 5/2020 |
| WO | WO2016164973 A1 | 10/2016 |

* cited by examiner

SEALED DRIVE FOR CONNECTING PROGRESSIVE CAVITY PUMP ROTORS TO UNIVERSAL JOINTS

This application claims the benefit of U.S. Provisional Application No. 62/936,924 filed Nov. 18, 2019 for "SEALED DRIVE FOR CONNECTING PROGRESSIVE CAVITY PUMP ROTORS TO UNIVERSAL JOINTS" by D. M. Muckley and P. M. Jones.

BACKGROUND

The present invention relates generally to fluid pumps, and more particularly to a progressive cavity (PC) pump. PC pumps can be utilized for moving a viscous material, such as thermal interface material (TIM), and can include a universal joint for use in such a pump system. In most compositions, TIM is made with 80-90% Aluminum Oxide, which is highly abrasive on mechanical components, including pump components. Fluid-contacting components for systems that pump TIM and similar materials must consequently either be capable of withstanding extremely heavy abrasive wear, or must be replaced frequently. Frequent part replacement increases operating expense, and in many systems also necessitates complex disassembly and reassembly.

The rotor portion of the PC pump is connected to the universal joint to be driven by the universal joint. A cup that forms part of the rotor is joined to a shaft of the universal joint by a pin driven through holes in the cup and shaft. This transmitted torque to the rotor from the drive shaft but allowed abrasive material to enter the pin holes an erode material until the connection failed. In some cases the rotor and universal joint are assembled together, which increases life but also increases replacement costs.

SUMMARY

According to one aspect of the disclosure, an assembly for a progressive cavity pump includes a universal joint having a torque input at a first axial end and a socket at a second axial end; a screw rotor having a drive shaft disposed in the socket and a pump shaft extending from the drive shaft; a locking nut connected to the universal joint and securing the screw rotor to the universal joint; wherein the drive shaft has a first contour and the socket has a second contour, the first contour mating with the second contour such that the universal joint can transmit torque to the rotor via a connection between the drive shaft and the socket.

DETAILED DESCRIPTION

Figure 1:
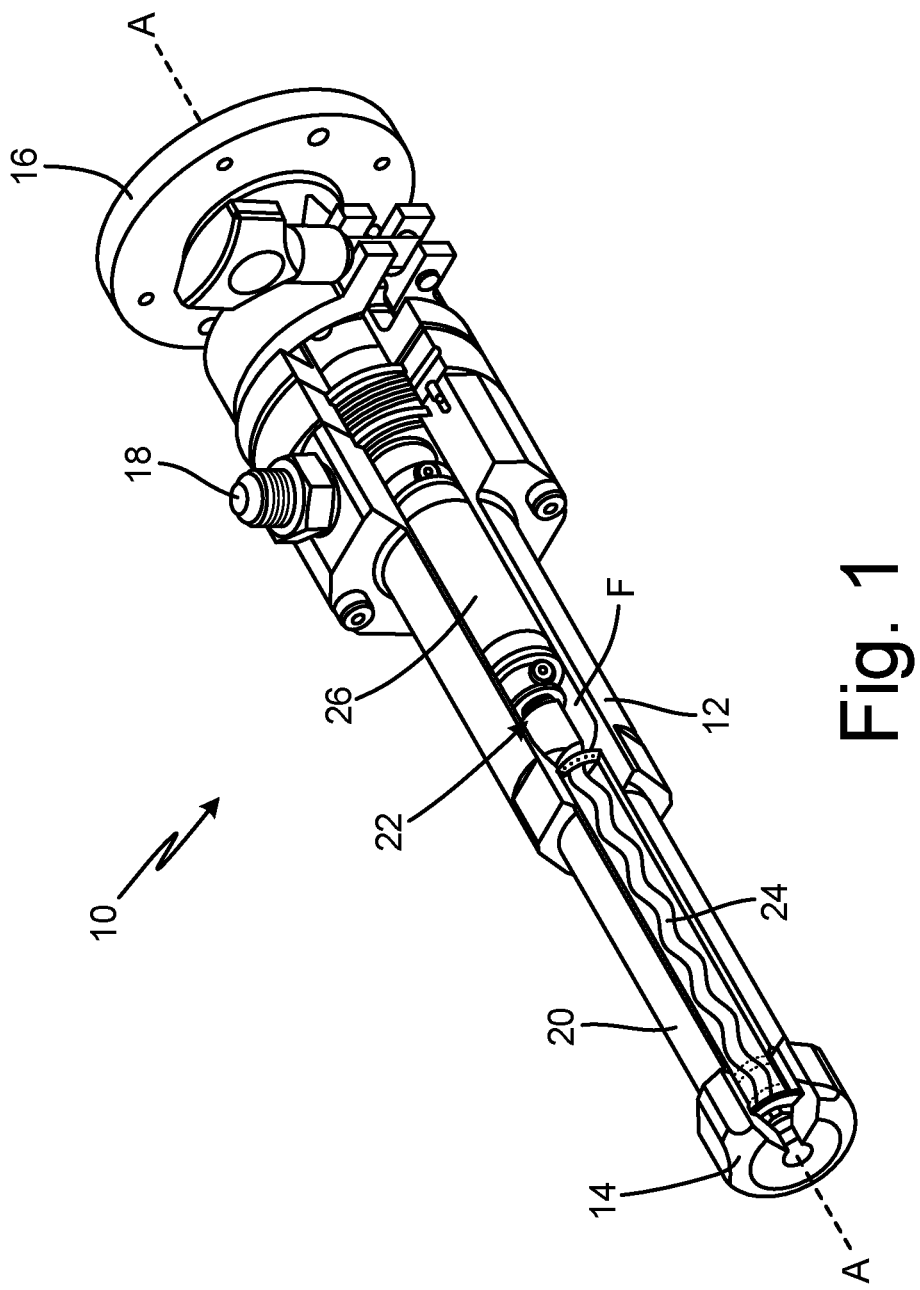
FIG. 1 is a cut-away isometric view of a progressive cavity pump.

FIG. 1 is a cut-away perspective view of progressive cavity (PC) pump 10. PC pump 10 is capable of pumping highly viscous or granular materials, such as thermal interface material (TIM). Progressive cavity pump 10 includes housing 12, nozzle 14, torque input 16, fluid inlet 18, stator cylinder 20, and assembly 22. Assembly 22 includes screw rotor 24, and universal joint 26, as well as numerous additional un-numbered components and sub-components. PC pump 10 extends along axis A-A, which represents both a fluid flow axis and a torque transmission axis. Housing 12 acts as a rigid enclosure for other components of PC pump 10, and both serves as the structural framework for PC pump 10 and defines an interior fluid flow cavity F within PC pump 10, through which TIM flows during operation of PC pump 10. Nozzle 14 provides an exit aperture for material to exit from PC pump 10. Torque input 16 receives torque, e.g. from a motor (not shown), and supplies torque to rotor 24 via universal joint 26. Fluid inlet 18 accepts material (e.g. TIM) into flow cavity F, and can for example be fed by an external material line (not shown) from a dedicated material source. Stator cylinder 20 is a resilient, contoured cylinder formed, for example, from rubber or semi-flexible polymer. Screw rotor 24 is a rigid screw-shaped body housed snugly within stator cylinder 20. Screw rotor 24 is coupled to torque input 16 via universal joint 26, which transmits torque while permitting lateral (i.e. radial) displacement of screw rotor 24 with respect to axis A.

During ordinary operation, material enters PC pump 10 via fluid inlet 18, and is pumped towards nozzle 14 by rotation of screw rotor 24 within stator cylinder 20. Screw rotor 24 is driven by torque input 16 through universal joint 26. Torque input 16 rotates on axis A-A on bearings within housing 12, as shown. By contrast, screw rotor 24 is offset, e.g. by 1-2$mm$, from axis A-A, and orbits axis A-A while rotating. Specifically, stator cylinder 20 constrains screw rotor 24 such that screw rotor 24 moves about axis A-A in an orbit that counter-rotates with respect to the rotation direction of screw rotor 24. Universal joint 26 transfers torque from axially-aligned torque input 16 to eccentrically-aligned screw rotor 24, while permitting (only) radial translation of screw rotor 24 as required for screw rotor 24 to orbit axis A-A within stator cylinder 20. Universal joint 26 is configured to bear heavy torque and off-axis loads with high durability and easy assembly.

Figure 2A:
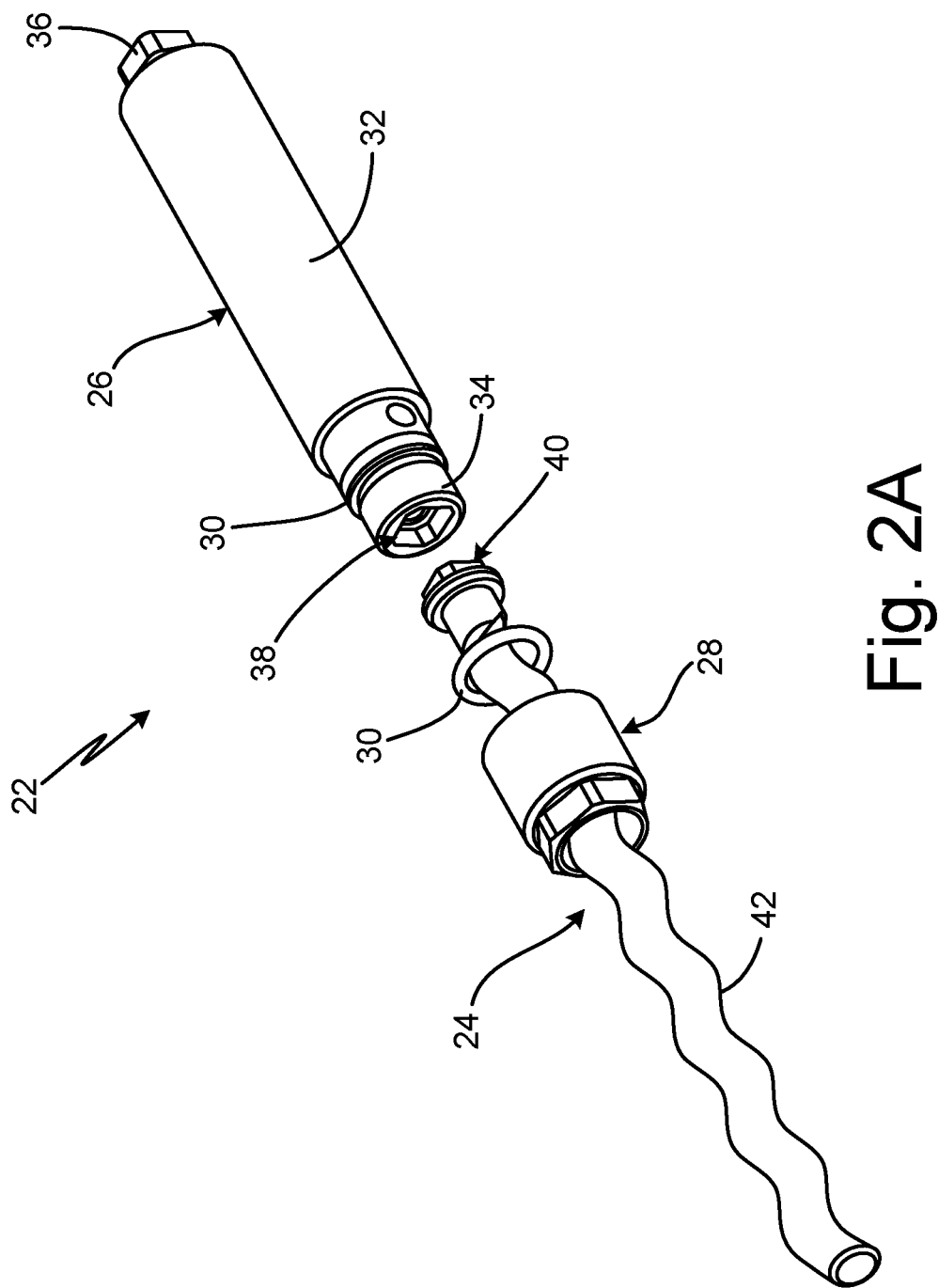
FIG. 2A is an exploded view of a rotor and universal joint assembly.
Figure 2B:
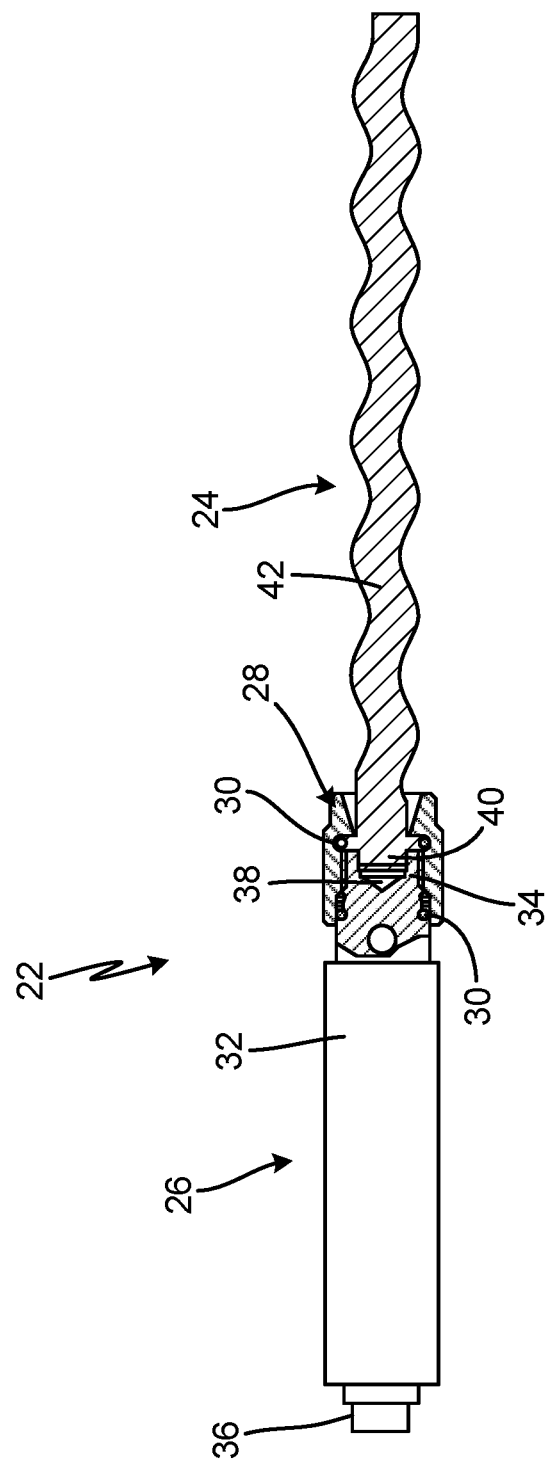
FIG. 2B is a partial cut-away isometric view showing a connection between a rotor and universal joint.

FIG. 2A is an exploded view of assembly 22. FIG. 2B is a partial cut-away view of assembly 22 showing a connection between screw rotor 24 and universal joint 26. FIGS. 2A and 2B will be discussed together. Assembly 22 includes rotor 24, universal joint 26, locking nut 28, and o-rings 30. Universal joint 26 includes housing 32, threaded portion 34, torque input 36, and socket 38. Rotor 24 includes drive shaft 40 and pump shaft 42.

Assembly 22 forms part of a PC pump, such as PC pump 10 (FIG. 1). Universal joint 26 is disposed between a drive, such as a motor (not shown), and rotor 24. Universal joint 26 receives torque from the motor at torque input 36 and transmits the torque to rotor 24 via the connection between socket 38 and drive shaft 40 to drive rotation of rotor 24. Locking nut 28 secures rotor 24 to universal joint 26. Locking nut 28 threads onto threaded portion 34 to secure rotor 24 to universal joint 26. While locking nut 28 is described as connecting to universal joint 26 via interfaced threading, it is understood that locking nut 28 can connect to universal joint 26 in any desired manner, such as a bayonet connection, among other options.

O-rings 30, or other seals, are disposed between locking nut 28 and universal joint 26 and/or rotor 24 to prevent abrasive material from entering into the connection between universal joint 26 and rotor 24. In the example shown, a first o-ring 30 is disposed in a seal groove formed on universal joint 26 and a second o-ring 30 is disposed at the distal end of universal joint 26. Treaded portion 34 is disposed between the first and second o-rings 30.

Drive shaft 40 is disposed in socket 38. Universal joint 26 transmits torque to rotor 24 via the connection between drive shaft 40 and socket 38. Pump shaft 42 extends from drive shaft 40 and is disposed in a stator cylinder, such as stator cylinder 20 (FIG. 1). Rotation of pump shaft 42 in the stator pumps material through the PC pump. Assembly 22 allows for the replacement of either rotor 24 or universal joint 26 without replacing the other part. Drive shaft 40 includes an exterior contour and socket 38 includes a mating contour to facilitate the torque transmission. In the example shown, rotor 24 has a square shaft drive shaft 40 that inserts into square socket 38 in the end of universal joint 26. The connection is held together by locking nut 28 that is sealed on both ends with o-rings 30 to prevent the abrasive material from entering the connection. While drive shaft 40 and socket 38 are described as having mating square cross-sections, it is understood that drive shaft 40 and socket 38 can be of any desired configuration suitable for facilitating quick connection and torque transmission by inserting drive shaft 40 into socket 38 without requiring any additional connectors, such as pins. For example, each of drive shaft 40 and socket 38 can have triangular, rectangular, pentagonal, or any other suitable cross-sectional shape.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a progressive cavity pump, the assembly comprising:
   a universal joint having a torque input at a first axial end and a socket at a second axial end;
   a screw rotor having a drive shaft disposed in the socket and a pump shaft extending from the drive shaft;
   a locking nut connected to the universal joint by interfaced threading and securing the screw rotor to the universal joint by the interfaced threading;
   a first annular seal disposed between the universal joint and the locking nut and enclosed by the locking nut;
   a second annular seal disposed between the universal joint and the locking nut and enclosed by the locking nut, the second annular seal disposed such that the threaded interface is disposed between the first annular seal and the second annular seal; and
   the drive shaft has a first contour and the socket has a second contour, the first contour mating with and positively engaging the second contour such that the universal joint can transmit torque to the rotor via a connection between the first contour of the drive shaft and the second contour of the socket.

2. The assembly of claim 1, wherein the drive shaft has a square contour.

3. The assembly of claim 2, wherein the socket has a square contour.

4. The assembly of claim 1, wherein each of the first seal and the second seal comprise o-rings.

5. The assembly of claim 1, wherein the universal joint includes a seal groove adjacent a threaded portion of the universal joint.

6. A progressive cavity pump comprising:
   the assembly of any one of claims 1-3, 4, or 5;
   a stator cylinder, wherein the pump shaft is disposed in the stator cylinder.

* * * * *